(12) United States Patent
Park et al.

(10) Patent No.: US 10,531,486 B2
(45) Date of Patent: Jan. 7, 2020

(54) METHOD FOR TRANSMITTING UPLINK SIGNAL AND DEVICE THEREFOR

(71) Applicant: LG ELECTRONICS INC., Seoul (KR)

(72) Inventors: Hanjun Park, Seoul (KR); Joonkui Ahn, Seoul (KR); Suckchel Yang, Seoul (KR); Hanbyul Seo, Seoul (KR); Seonwook Kim, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 15/533,953

(22) PCT Filed: Jan. 27, 2016

(86) PCT No.: PCT/KR2016/000841
§ 371 (c)(1),
(2) Date: Jun. 7, 2017

(87) PCT Pub. No.: WO2016/122197
PCT Pub. Date: Aug. 4, 2016

(65) Prior Publication Data
US 2017/0374679 A1 Dec. 28, 2017

Related U.S. Application Data

(60) Provisional application No. 62/108,526, filed on Jan. 27, 2015.

(51) Int. Cl.
*H04W 74/04* (2009.01)
*H04W 74/00* (2009.01)
(Continued)

(52) U.S. Cl.
CPC .............. *H04W 74/04* (2013.01); *H04L 5/00* (2013.01); *H04L 5/0044* (2013.01);
(Continued)

(58) Field of Classification Search
CPC ............. H04W 74/04; H04W 74/0808; H04W 74/004; H04W 72/1231; H04L 5/0051;
(Continued)

(56) References Cited

U.S. PATENT DOCUMENTS

2009/0239476 A1* 9/2009 Womack .............. H04L 5/0094
455/68
2014/0044105 A1 2/2014 Bontu et al.
(Continued)

FOREIGN PATENT DOCUMENTS

WO WO-2013006006 A2 * 1/2013 ............ H04W 16/14

OTHER PUBLICATIONS

PCT International Application No. PCT/KR2016/000841, Written Opinion of the International Searching Authority dated May 4, 2016, 16 pages.
(Continued)

*Primary Examiner* — Minjung Kim
(74) *Attorney, Agent, or Firm* — Lee Hong Degerman Kang & Waimey

(57) ABSTRACT

A method for transmitting an uplink signal in an unlicensed band in a wireless communication system according to an embodiment of the present invention, which is performed by a terminal, may comprises the steps of: performing channel sensing for transmitting data and a sounding reference signal in a first time interval; transmitting the sounding reference signal in a second time interval immediately following the first time interval when a channel is in a non-occupied state according to a result of the channel sensing and transmission of the sounding reference signal is scheduled; and transmit-
(Continued)

ting a preliminary signal or transmitting uplink data in the second time interval immediately following the first time interval when a channel is in a non-occupied state according to a result of the channel sensing and only transmission of the uplink data is scheduled.

12 Claims, 15 Drawing Sheets

(51) Int. Cl.
  *H04W 72/12* (2009.01)
  *H04L 5/00* (2006.01)
  *H04W 74/08* (2009.01)

(52) U.S. Cl.
  CPC .......... *H04L 5/0051* (2013.01); *H04W 74/004* (2013.01); *H04W 74/0808* (2013.01); *H04L 5/0023* (2013.01); *H04L 5/0035* (2013.01); *H04W 72/1231* (2013.01)

(58) Field of Classification Search
  CPC ....... H04L 5/0044; H04L 5/00; H04L 5/0023; H04L 5/0035
  See application file for complete search history.

(56) References Cited

U.S. PATENT DOCUMENTS

| | | | |
|---|---|---|---|
| 2014/0112277 A1 | 4/2014 | Yang et al. | |
| 2014/0112289 A1* | 4/2014 | Kim | H04W 16/14 370/329 |
| 2016/0143014 A1* | 5/2016 | Mukherjee | H04W 74/0816 370/330 |

OTHER PUBLICATIONS

LG Electronics, "LBT operation details and initial evaluation results", 3GPP TSG RAN WG1 Meeting #79, R1-144900, Nov. 2014, 7 pages.
NTT DOCOMO, "Views on issues related to LAA UL", 3GPP TSG RAN WG1 Meeting #79, R1-144970, Nov. 2014, 4 pages.
LG Electronics, "Clarification of PUSCH rate matching with SRS", 3GPP TSG RAN WG1 Meeting #78bis, R1-144008, Oct. 2014, 2 pages.

* cited by examiner

FIG. 20

| 0 | 1 | 2 |  | 3 | 4 | 5 | 6 | 7 | 8 |  | 9 |  |  |
|---|---|---|---|---|---|---|---|---|---|---|---|---|---|
| 10 | 11 | 12 |  | 13 | 14 | 15 | 16 | 17 | 18 |  | 19 |  |  |
| 20 | 21 | 22 |  | 23 | 24 | 25 | 26 | 27 | 28 |  | 29 |  |  |
| 30 | 24 | 31 |  | 32 | 26 | 33 | 34 | 25 | 35 |  | 36 |  |  |
| 37 | 21 | 0 |  | 1 | 23 | 2 | 3 | 22 | 4 |  | 5 |  |  |
| 6 | 18 | 7 |  | 8 | 20 | 9 | 10 | 19 | 11 |  | 12 |  |  |
| 13 | 15 | 20 |  | 15 | 17 | 16 | 17 | 16 | 18 |  | 21 |  |  |
| 20 | 12 | 16 |  | 19 | 14 | 23 | 24 | 13 | 18 |  | 17 |  |  |
| 27 | 9 | 12 |  | 15 | 11 | 30 | 31 | 10 | 14 |  | 13 |  |  |
| 34 | 6 | 8 |  | 11 | 8 | 37 | 38 | 7 | 10 |  | 9 |  |  |
| 41 | 3 | 4 |  | 7 | 5 | 44 | 45 | 4 | 6 |  | 5 |  |  |
| 48 | 0 | 0 |  | 3 | 2 | 51 | 52 | 1 | 2 |  | 1 |  |  |

▨ RI　▨ CQI/PMI　☐ U-SCH　▨ A/N　▥ RS

FIG. 21

| 0 | 1 | 2 |  | 3 | 4 | 5 |  | 7 | 8 |  | 9 | 10 |  |
|---|---|---|---|---|---|---|---|---|---|---|---|---|---|
| 11 | 12 | 13 |  | 14 | 15 | 16 |  | 17 | 18 |  | 19 | 20 |  |
| 21 | 22 | 23 |  | 24 | 25 | 26 |  | 27 | 28 |  | 29 | 30 |  |
| 31 | 32 | 33 |  | 34 | 35 | 36 |  | 37 | 0 |  | 1 | 2 |  |
| 3 | 4 | 5 |  | 6 | 7 | 8 |  | 9 | 10 |  | 11 | 12 |  |
| 13 | 24 | 14 |  | 15 | 16 | 17 |  | 26 | 18 |  | 19 | 25 |  |
| 20 | 20 | 20 |  | 22 | 23 | 23 |  | 22 | 24 |  | 21 | 21 |  |
| 26 | 16 | 16 |  | 19 | 19 | 29 |  | 18 | 18 |  | 17 | 17 |  |
| 32 | 12 | 12 |  | 15 | 15 | 35 |  | 14 | 14 |  | 13 | 13 |  |
| 38 | 8 | 8 |  | 11 | 11 | 41 |  | 10 | 10 |  | 9 | 9 |  |
| 44 | 4 | 4 |  | 7 | 7 | 47 |  | 6 | 6 |  | 5 | 5 |  |
| 50 | 0 | 0 |  | 3 | 3 | 53 |  | 2 | 2 |  | 1 | 1 |  |

▨ RI　▨ CQI/PMI　☐ U-SCH　▨ A/N　▥ RS

METHOD FOR TRANSMITTING UPLINK SIGNAL AND DEVICE THEREFOR

CROSS-REFERENCE TO RELATED APPLICATIONS

This application is the National Stage filing under 35 U.S.C. 371 of International Application No. PCT/KR2016/000841, filed on Jan. 27, 2016, which claims the benefit of U.S. Provisional Application No. 62/108,526, filed on Jan. 27, 2015, the contents of which are all hereby incorporated by reference herein in their entirety.

TECHNICAL FIELD

The present invention relates to a wireless communication system, and more particularly, to a method of transmitting an uplink signal and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

The present invention relates to a method of transmitting an uplink signal. An object of the present invention is to provide a method of efficiently reporting a channel state and appropriate scheduling according to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting an uplink signal, which is transmitted by a terminal on an unlicensed band in a wireless communication system, includes performing channel sensing for transmitting data and a sounding reference signal in a first time duration, transmitting a sounding reference signal in a second time duration immediately after the first time section if a channel is unoccupied and sounding reference signal transmission is scheduled as a result of the channel sensing, and transmitting a reservation signal or the uplink data in the second time duration immediately after the first time duration if a channel is unoccupied and uplink data transmission is scheduled only as a result of the channel sensing.

Additionally or alternatively, a position of the first time duration may vary depending on whether or not a subframe is configured to transmit a sounding reference signal.

Additionally or alternatively, a transmission length of the uplink data may be subframe-specifically determined.

Additionally or alternatively, the method may further include the transmitting the uplink data in at least one symbol after the second time duration in which the reservation signal is transmitted.

Additionally or alternatively, the reservation signal may include a sequence promised with a base station in advance or data transmitted via a PUSCH resource.

Additionally or alternatively, the reservation signal may be multiplexed with the sounding reference signal.

Additionally or alternatively, the reservation signal may be allocated to a resource corresponding to the outside of a cell-specific sounding reference signal bandwidth.

Additionally or alternatively, the reservation signal may be allocated to a resource corresponding to the inside of a terminal-specific sounding reference signal bandwidth.

Additionally or alternatively, if the first time duration is overlapped with a time duration in which uplink control information is to be transmitted, the method may further include mapping the uplink control information to the remaining time duration except the overlapped time duration or performing puncturing on the uplink control information allocated to the overlapped time duration.

Additionally or alternatively, if the second time duration is overlapped with a time duration in which uplink control information is to be transmitted, the method may further include transmitting the uplink control information without transmitting the sounding reference signal, or mapping the uplink control information to the remaining time duration except the overlapped time duration while transmitting the sounding reference signal or performing puncturing on the uplink control information allocated to the overlapped time duration.

Additionally or alternatively, the method may further include allocating an uplink modulation reference signal in a time duration of a subframe in which the sounding reference signal is transmitted, the time duration being different from a time duration in which an uplink modulation reference signal is allocated in a normal subframe.

Additionally or alternatively, the time duration may include one uplink symbol or the half of an uplink symbol.

To further achieve these and other advantages and in accordance with the purpose of the present invention, according to a different embodiment, a terminal for transmitting an uplink signal on an unlicensed band in a wireless communication system includes an RF (radio frequency) unit and a processor controls the RF unit, the processor performs channel sensing for transmitting data and a sounding reference signal in a first time duration, if a channel is unoccupied and sounding reference signal transmission is scheduled as a result of the channel sensing, transmits a sounding reference signal in a second time duration immediately after the first time duration, if a channel is unoccupied and uplink data transmission is scheduled only as a result of the channel sensing, and transmits a reservation signal or the uplink data in the second time duration immediately after the first time duration.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to more efficiently transmit uplink control information.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 20 is a diagram for an example of mapping a resource of UCI according to one embodiment of the present invention;

FIG. 21 is a diagram for an example of mapping a resource of UCI according to one embodiment of the present invention;

BEST MODE

Mode for Invention

Figure 1:
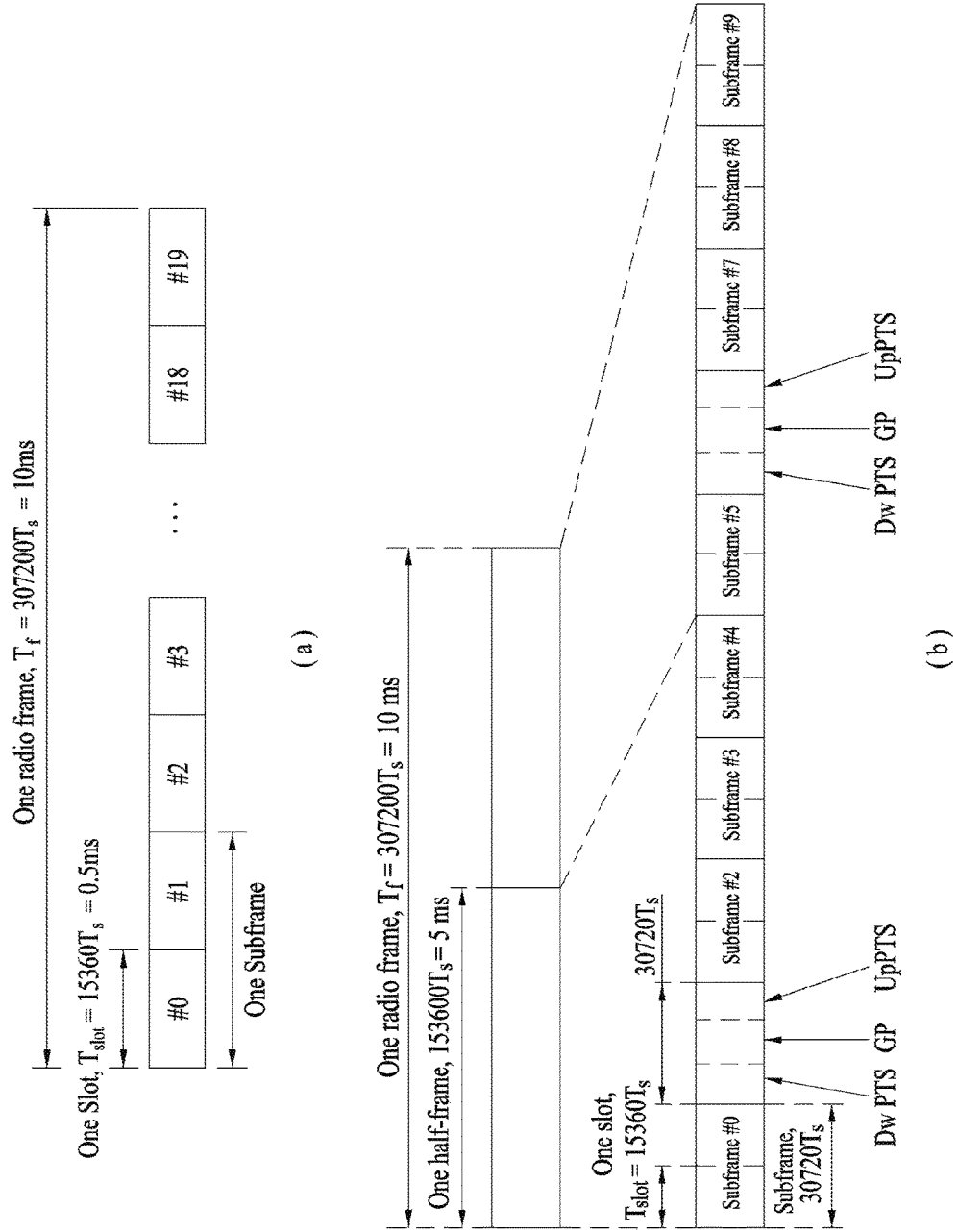
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and sub-carriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |

TABLE 2-continued

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
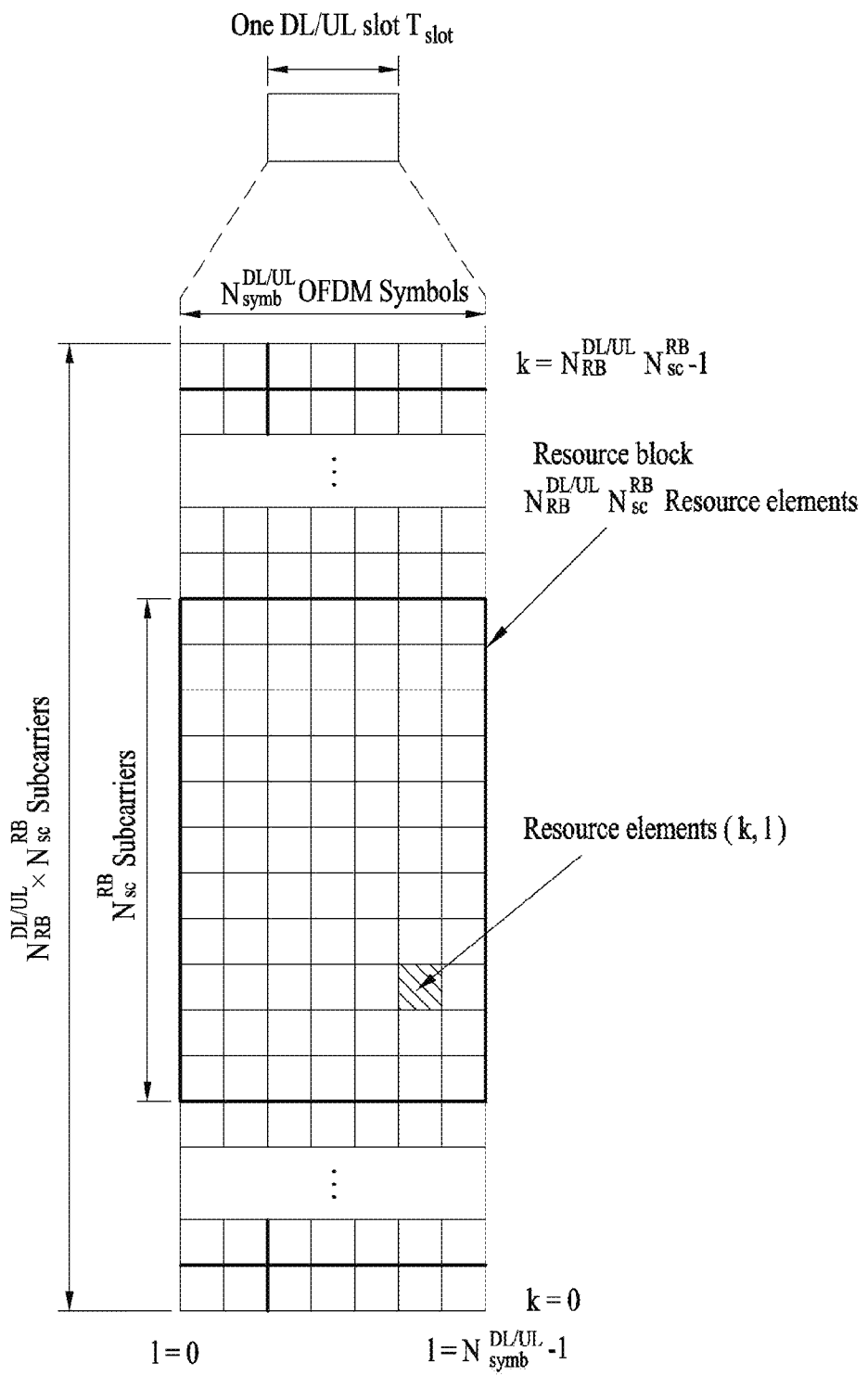
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
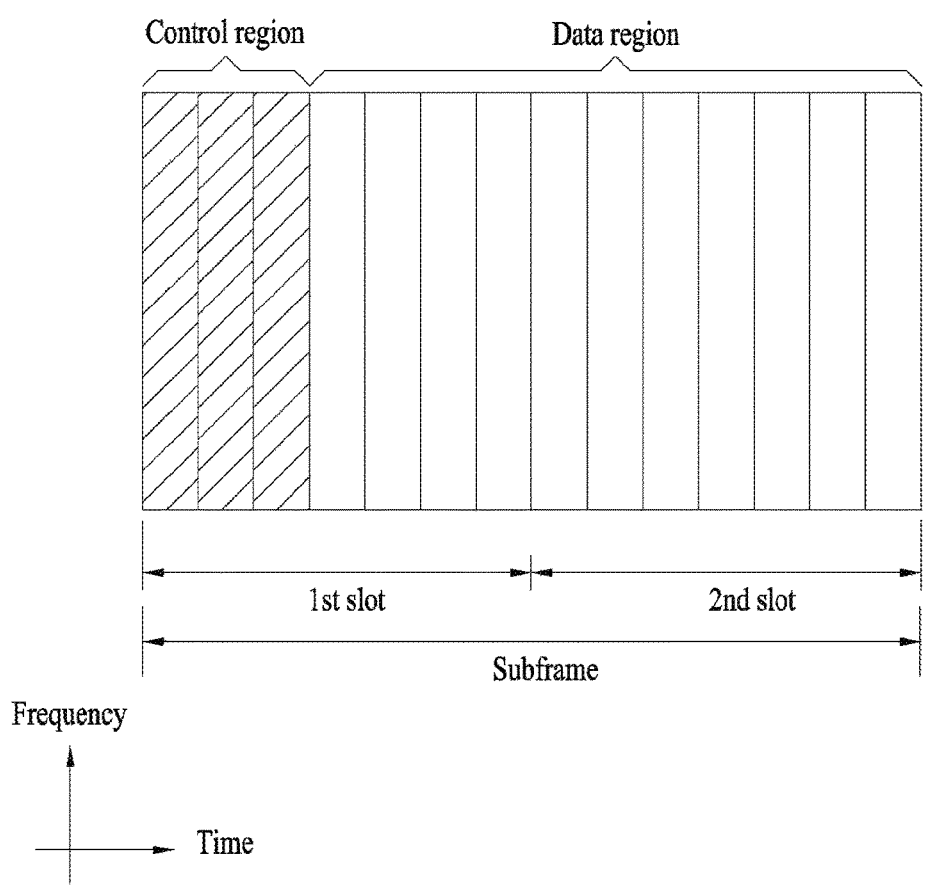
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Areation levels defining the search space is as follows.

TABLE 3

| Search Space | | | Number of |
| --- | --- | --- | --- |
| Type | Aggregation Level L | Size [in CCEs] | PDCCH candidates $M^{(L)}$ |
| UE-specific | 1 | 6 | 6 |
| | 2 | 12 | 6 |
| | 4 | 8 | 2 |
| | 8 | 16 | 2 |

TABLE 3-continued

| Search Space | | | Number of |
| --- | --- | --- | --- |
| Type | Aggregation Level L | Size [in CCEs] | PDCCH candidates $M^{(L)}$ |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
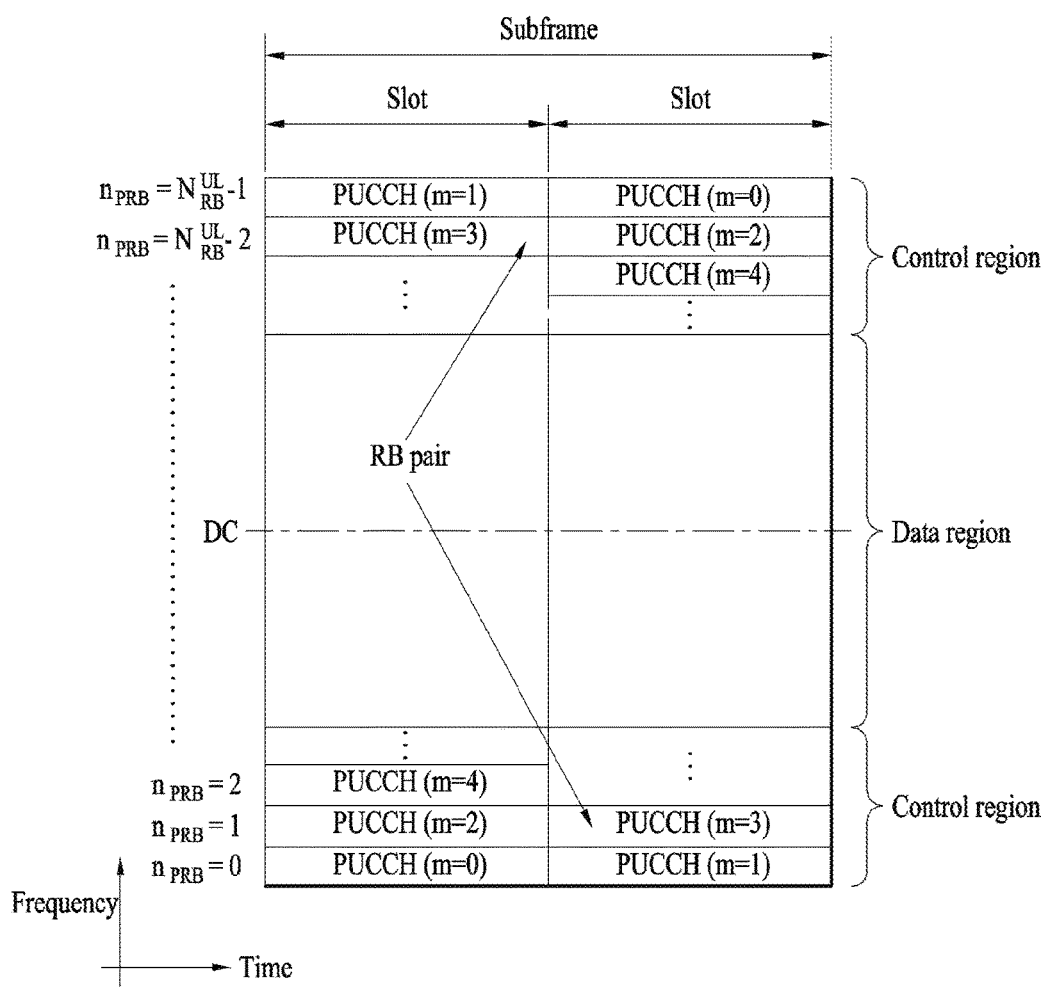
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMFRI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 5 below.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI transmission via PUSCH after receiving CSI transmission request control signal.

A control signal for requesting transmission of a CSI may be included in a PUSCH scheduling control signal (UL grant) transmitted via a PDCCH signal. Table 5 below shows the mode of the UE when the CQI, the PMI and the RI are transmitted via the PUSCH.

TABLE 6

|  |  | PMI Feedback Type | | |
|---|---|---|---|---|
|  |  | No PMI | Single PMI | Multiple PMIs |
| PUSCH CQI Feedback Type | Wideband (Wideband CQI) |  |  | Mode 1-2<br>RI<br>1st wideband CQI(4 bit)<br>2nd wideband CQI(4 bit) if RI > 1<br>N*Subband PMI(4 bit)<br>(N is the total # of subbands)<br>(if 8Tx Ant, N*subband W2 + wideband W1) |
|  | UE selected (Subband CQI) |  | Mode 2-0<br>RI (only for Open-loop SM)<br>1st wideband CQI(4 bit) + Best-M CQI(2 bit)<br>(Best-M CQI: average CQI for selected M SB(s) among N SBs)<br>Best-M index (L bit) | Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M |

TABLE 6-continued

| | PMI Feedback Type | | |
|---|---|---|---|
| | No PMI | Single PMI | Multiple PMIs |
| Higher Layer-configured (Subband CQI) | Mode 3-0<br>RI (only for Open-loop SM)<br>1st wideband CQI(4 bit) + N*subband CQI(2 bit) | Mode 3-1<br>RI<br>1st wideband CQI(4 bit) + N*subbandCQI(2 bit)<br>2nd wideband CQI(4 bit) + N*subbandCQI(2 bit) if RI > 1<br>Wideband PMI(4 bit)<br>(if 8Tx Ant, wideband W2 + wideband W1) | PMI(4 bit)<br>(if 8Tx Ant, wideband W2 + Best-M W2 + wideband W1)<br>Mode 3-2<br>RI<br>1st wideband CQI(4 bit) + N*subbandCQI(2 bit)<br>2nd wideband CQI(4 bit) + N*subbandCQI(2 bit) if RI > 1<br>N*Subband PMI(4 bit)<br>(N is the total # of subbands)<br>(if 8Tx Ant, N*subband W2 + wideband W1) |

The transmission mode of Table 6 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

In Mode 3-2, the UE generate a precoding matrix for each subband instead of a single precoding matrix for system bandwidth, to be compared with Mode 3-1.

2) Periodic CQI/PMI/RI Transmission via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 7 below.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 7. Referring to Table 7, in Mode 2-0 and Mode 2-1, a bandwidth (BP) part is a set of subbands continuously located in a frequency domain and may cover a system bandwidth or a specified set S. In Table 7, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.

i) Type 1: A subband CQI (SB-CQI) of Mode 2-0 and Mode 2-1 is transmitted.

ii) Type 1a: A subband CQI and a second PMI are transmitted.

iii) Type 2, Type 2b, Type 2c: A wideband CQI and a PMI (WB-CQI/PMI) are transmitted.

iv) Type 2a: A wideband PMI is transmitted.

v) Type 3: An RI is transmitted.

vi) Type 4: A wideband CQI is transmitted.

vii) Type 5: An RI and a wideband PMI are transmitted.

viii) Type 6: An RI and a PTI are transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

The present invention proposes a method of transmitting an SRS (sound reference signal) in consideration of an LBT (listen before talk) operation in UL (uplink) of a wireless communication system operating on an unlicensed band.

Recently, with the advent of a smart device, data traffic is considerably increasing. As a result, a next generation wireless communication system such as 3GPP LTE-A is trying to find ways to efficiently utilizing a limited frequency band. In particular, the next generation wireless communication system considers managing a cellular network on such an unlicensed band as 2.4 GHz or 5 GHz. The unlicensed band regulates each of communication nodes to perform wireless transmission and reception based on an LBT operation such as CCA (clear channel assessment) and the like.

Figure 5:
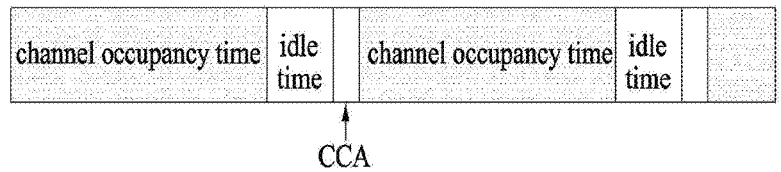
FIG. 5 is a diagram for an example of an LBT (listen before talk) based channel access operation according to an FBE (frame based equipment)

For example, regulation of Europe illustrates two types of LBT-based channel access operation respectively referred to as FBE (frame based equipment) and LBE (load based equipment). The FBE configures a single frame using channel occupancy time (e.g., 1~10 ms) corresponding to time capable of maintaining transmission when a communication node succeeds in accessing a channel and idle time corresponding to the minimum 5% of the channel occupancy time. The CCA is defined as an operation of observing a channel for at least 20 μs of the last part of the idle time. In this case, a communication node periodically performs the CCA in a unit of the frame. If a channel is unoccupied, the communication node transmits data during the channel occupancy time. If a channel is occupied, the communication node waits until a CCA slot of a next period while postponing transmission. FIG. 5 shows an example of the FBE operation.

Figure 6:
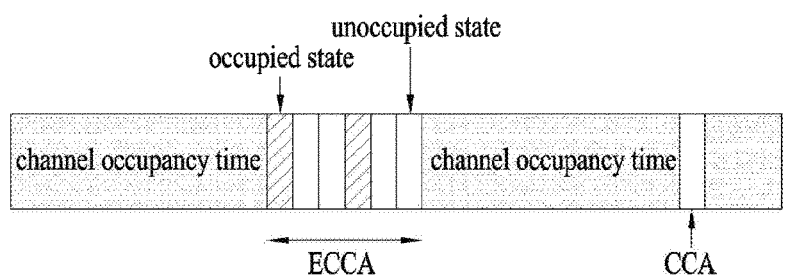
FIG. 6 is a diagram for an example of an LBT (listen before talk) based channel access operation according to an LBE (load based equipment)

Meanwhile, in case of the LBE, a communication node configures a value of $q \in \{4, 5, \ldots, 32\}$ first and performs CCA on a single slot. If a channel is unoccupied in the first CCA slot, the communication node can transmit data by securing channel occupancy time as much as a length of (13/32)q ms. If a channel is occupied in the first CCA slot, the communication node randomly selects a value of $N \in \{1, 2, \ldots, q\}$, stores the selected value as an initial value of a counter, and senses a channel state in a unit of a CCA slot. If a channel is unoccupied in a specific CCA slot, the communication node reduces the value stored in the counter by 1. If the value stored in the counter becomes 0, a user equipment (UE) can transmit data with channel occupancy time as much as a length of (13/32)q ms. FIG. 6 shows an example of the LBE operation.

In the example, an occupied state of a channel or an unoccupied state of the channel can be determined based on whether or not reception power exceeds a prescribed threshold in a CCA slot. For example, according to the Wi-Fi standard (e.g., 801.11ac), a CCA threshold is regulated by −62 dBm and −82 dBm for a non-Wi-Fi signal and a Wi-Fi signal, respectively. In particular, if a signal rather than a Wi-Fi signal is received with power equal to or greater than −62 dBm, an STA (station) or an AP (access point) does not perform signal transmission to avoid interference occurrence. Meanwhile, a wireless communication system such as 3GPP LTE-A, and the like, considers a method of combining a cell operating on a licensed band (hereinafter, L-cell) and a cell operating on an unlicensed band (hereinafter, U-cell) with each other using a CA (carrier aggregation) technique and a method of performing LBT-based DL/UL transmission in the U-cell. In this case, in case of UL, it may be preferable to apply the FBE operation among the LBT operations due to a problem of HARQ process timing.

Meanwhile, a wireless communication system such as 3GPP LTE and the like supports SRS transmission of a UE to estimate quality of a UL channel for the purpose of link adaptation and the like in UL. For example, in LTE system, a UE can transmit a type 0 SRS (i.e., periodic SRS) triggered by higher layer signalling and a type 1 SRS (i.e., aperiodic SRS) triggered by DCI (downlink control information) in an SRS subframe configured by an eNB in advance.

Figure 7:
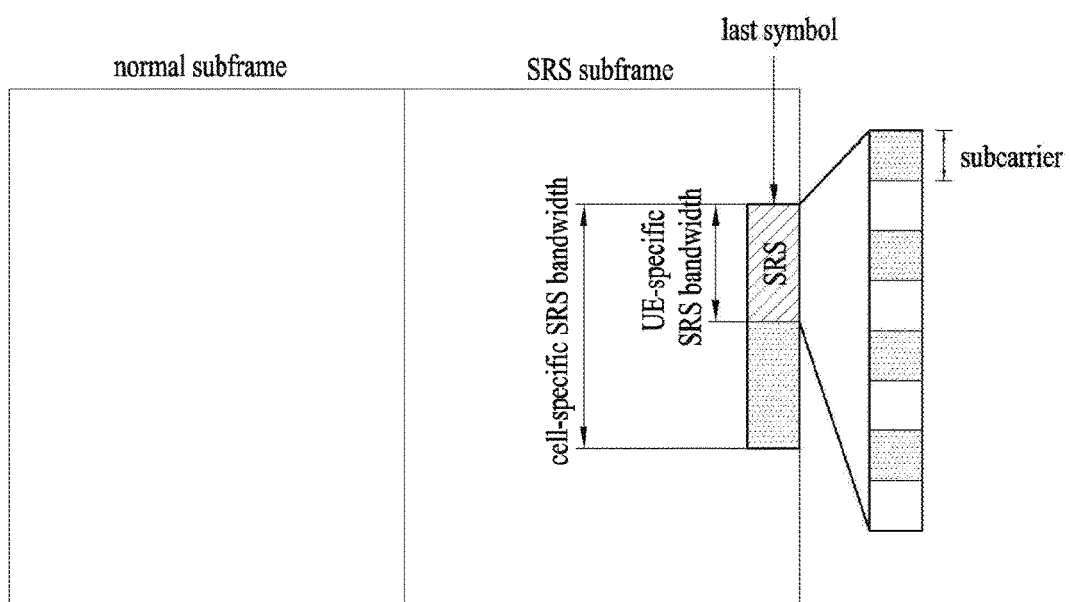
FIG. 7 is a diagram for SRS (sounding reference signal) resource allocation.

In this case, an SRS subframe in which the type 0 SRS is transmitted and an SRS subframe in which the type 1 SRS is transmitted can be independently configured. A position of a time axis at which an SRS is transmitted in the SRS subframe corresponds to the last SC-FDMA symbol and an SRS is transmitted at a position of a frequency axis with a UE specific SRS bandwidth configured via UE dedicated RRC (radio resource control) signalling within a cell specific SRS bandwidth indicated by SIB 2 (system information block 2) and a frequency offset. FIG. 7 shows an example that an SRS is transmitted in a subframe consisting of 14 SC-FDMA symbols in total in normal CP environment. In this case, UL transmission transmitted in the SRS subframe supports following operations for a random UE in LTE system.

Reference 1

(a) Case 1: transmission of PUSCH only
(b) Case 2: transmission of PUSCH and SRS (i.e., PUSCH+SRS)
(c) Case 3: transmission of SRS only In this case, the LTE system supports UEs different from each other (e.g., UE1 and UE2) to perform a different operation of [Reference 1] at the same time. For example, as shown in [Reference 2], it may consider multiplexing of UL transmission for the UE1 and the UE2.

Reference 2

(a) Mux 1: $UE_1$—Case 1, $UE_2$—Case 3
(b) Mux 2: $UE_1$—Case 2, $UE_2$—Case 3

Hence, when a cell operating on an unlicensed band (i.e., U-cell) exists in a system such as 3GPP LTE-A and the like and the U-cell supports UL transmission, it is necessary for the U-cell to support the UL transmission cases of the [Reference 1] and the UL multiplexing of the [Reference 2]. If an LBT operation follows an FBE scheme to identically maintain HARQ process timing with a legacy LTE system, the cases shown in the [Reference 1] (e.g., cases 1, 2 and 3) can be represented as FIG. 8.

Figure 8:
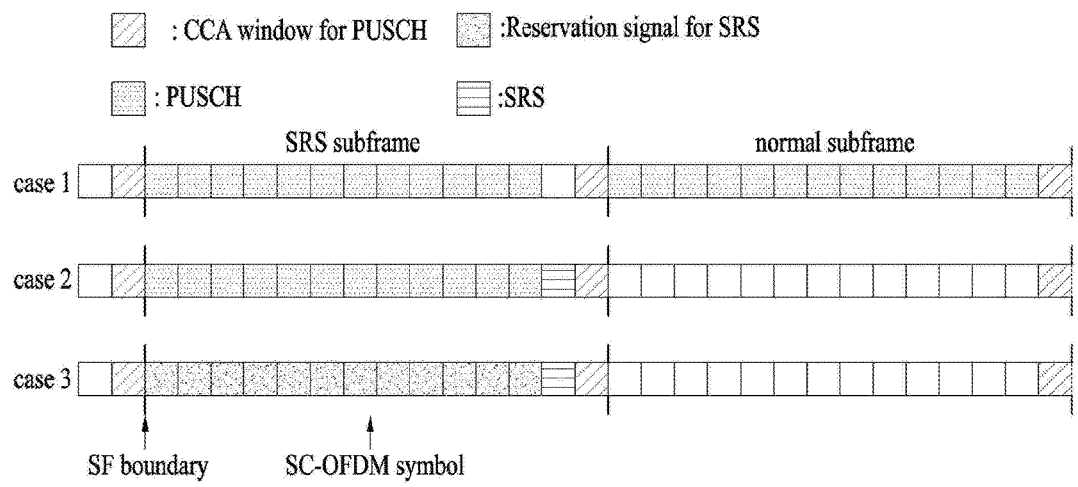
FIG. 8 is a diagram for a usage per symbol in an SRS subframe and a normal subframe according to one embodiment of the present invention.

In FIG. 8, in case of FBE, a CCA window corresponds to a time duration including idle time and a CCA slot. In case of LBE, the CCA window corresponds to an ECCA section. As mentioned in the foregoing description, if an SRS is transmitted at the last SC-FDMA symbol of a subframe in a U-cell that follows the FBE scheme, although a specific UE transmits an SRS only, due to the regulation of the FBE, it is necessary to transmit a dummy signal such as a reservation signal and the like until the SRS is transmitted. Hence, in case of the case 3, although a UE transmits an SRS only, a reservation signal is transmitted as well in a PUSCH resource. In particular, an inefficient case may occur. If the case 1 and the case 3 coexist due to the operation of the case 3, it is preferable not to support Mux 1 that UEs different from each other transmit PUSCH and an SRS, respectively. This is because a reservation signal for transmitting an SRS is applied to a PUSCH resource of a different UE as a relatively strong interference signal. Similar to the Mux 1, it is preferable not to support Mux 2 supporting both the case 2 and the case 3 at the same time in consideration of interference caused by a reservation signal for transmitting an SRS. The interference may influence on a different PUSCH resource. As mentioned in the foregoing description, if operations of the Mux 1 and the Mux 2 are not supported, when a random UE transmits PUSCH in an SRS subframe, an SRS transmitted by the UE can be transmitted only. SRS transmission only of a different UE is restricted to avoid an impact of interference caused by a reservation signal.

Hence, the present invention proposes a method of transmitting an SRS that enables a UE to support the operations of the [Reference 1] and the [Reference 2] in a U-cell in which UL transmission is performed based on LBT. In the following, the present invention illustrates operations in LTE system. Yet, the present invention can be extensively applied to a random wireless communication system in which an SRS is transmitted based on LBT as well. For clarity, the operations of the present invention are explained in FBE environment. However, the present invention may be non-limited to a specific LBT operation (i.e., FBE operation). The operations of the present invention can be applied to a wireless communication system that follows a random LBT operation.

[SRS Transmission Option]

(1) Dual CCA for SRS and PUSCH

When a UE performs signal transmission based on an LBT operation according to specific embodiments of the present invention, the present invention proposes a method of configuring a CCA section (or CCA window) for transmitting an SRS irrespective of a CCA section (or CCA window) for transmitting PUSCH (or data). In this case, the CCA section corresponds to a section where the UE senses an occupied state or an unoccupied state of a channel. The UE does not perform signal transmission in the CCA section.

As mentioned in the foregoing description, if a CCA section for transmitting an SRS is separately configured, it may be able to minimize the use of a reservation signal for SRS transmission in FIG. 8. For example, if the CCA section for transmitting the SRS is configured immediately before the SRS, the SRS can be transmitted without using a separate reservation signal. Or, the CCA section for transmitting the SRS can be configured between timing at which a CCA section for transmitting PUSCH ends and timing at which SRS transmission starts. In this case, it may be able to transmit a reservation signal during a period between timing at which a CCA section for transmitting an SRS ends and timing at which the SRS is transmitted.

In the following, a case of configuring a subframe consisting of 14 SC-FDMA symbols in total is described in detail. A PUSCH CCA and an SRS CCA correspond to a CCA period for transmitting PUSCH and a CCA period for transmitting an SRS, respectively.

Embodiment 1-1

Figure 9:
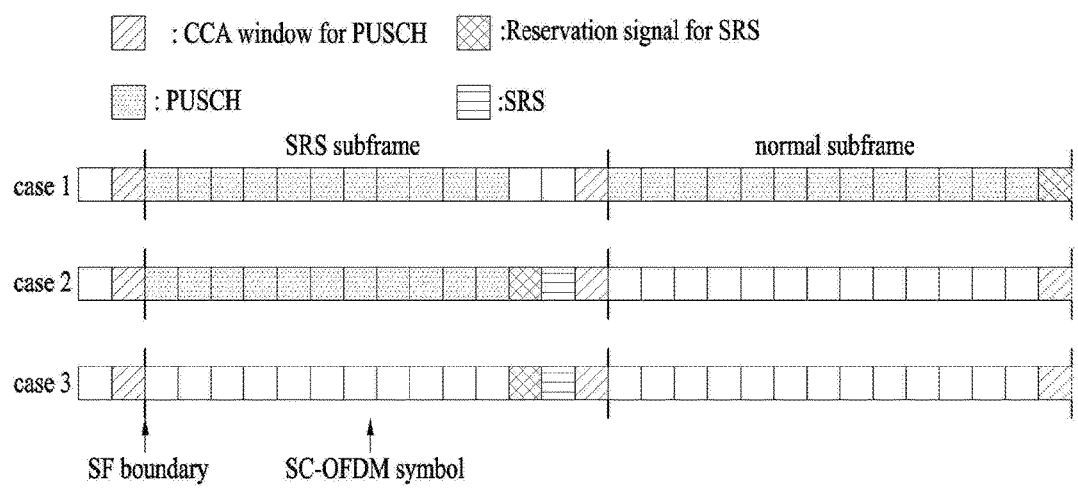
FIG. 9 is a diagram for a usage per symbol in an SRS subframe and a normal subframe according to one embodiment of the present invention.

PUSCH CCA
$14^{th}$ symbol (last symbol) of normal/SRS subframe
SRS CCA
$12^{th}$ symbol (symbol appearing prior to the last symbol as many as two symbols) of SRS subframe
SRS
$13^{th}$ symbol (symbol appearing prior to the last symbol as many as one symbol) of SRS subframe
FIG. 9 shows a usage of each symbol in the cases 1 to 3 in case of following the embodiment 1-1.

Embodiment 1-2

Figure 10:
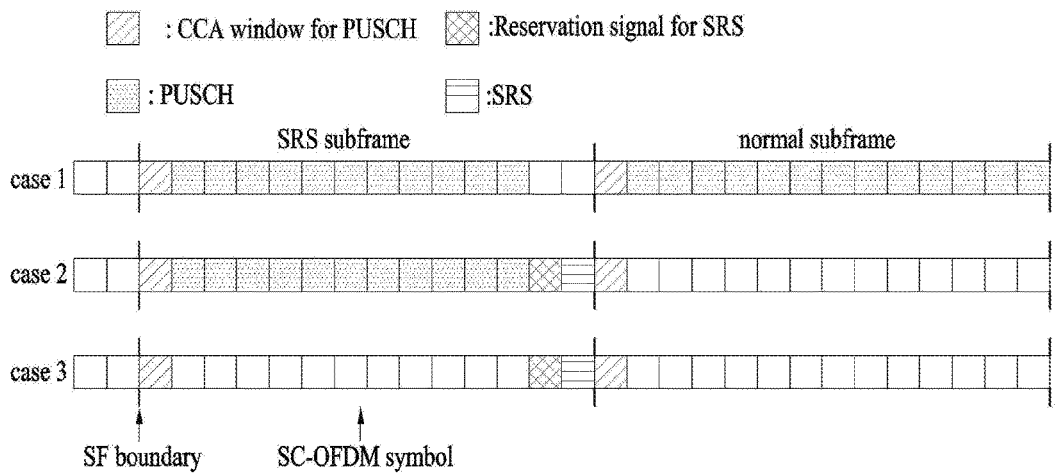
FIG. 10 is a diagram for a usage per symbol in an SRS subframe and a normal subframe according to one embodiment of the present invention.

PUSCH CCA
$1^{st}$ symbol of normal/SRS subframe
SRS CCA
$13^{th}$ symbol (symbol appearing prior to the last symbol as many as one symbol) of SRS subframe
SRS
$14^{th}$ symbol (last symbol) of SRS subframe
FIG. 10 shows a usage of each symbol in the cases 1 to 3 in case of following the embodiment 1-2.

The embodiments 1-1 and 1-2 have characteristics described in the following.

(i) SRS CCA is configured in a symbol immediately before an SRS is transmitted in an SRS subframe.

(ii) PUSCH (or data) is not transmitted in the SRS CCA in the SRS subframe

In this case, the SRS CCA is subframe-specifically determined. The SRS CCA is not configured in a normal subframe. The SRS CCA is configured in an SRS subframe only. Similarly, a transmission length of PUSCH is also subframe-specifically determined. A transmission length of PUSCH in a normal subframe is different from a transmission length of PUSCH in an SRS subframe (i.e., the transmission length of PUSCH in the SRS subframe is shorter than the transmission length of PUSCH in the normal subframe). The structure for transmitting an SRS and PUSCH proposed by the [Embodiment 1-1] and the [Embodiment 1-2] can support the UL transmission operation of the Mux 1 and the Mux 2 shown in the [Reference 2].

(2) Single CCA+Reservation Signal (PUSCH)

When a UE performs signal transmission based on an LBT operation according to specific embodiments of the present invention, if a CCA section (or CCA window) for transmitting PUSCH (or data) and a CCA section (or CCA window) for transmitting an SRS are configured at the same timing and a channel is unoccupied after the CCA section, (a) if the UE transmits both PUSCH (data) and an SRS, or transmits the SRS only, the UE transmits the SRS immediately after the CCA. If PUSCH (data) exist right after the SRS, the UE can consecutively transmit the PUSCH (data)

(b) if the UE transmits PUSCH (data) only, the UE transmits a reservation signal right after the CCA and consecutively transmits PUSCH (data). In this case, the CCA section corresponds to a section where the UE senses an occupied or an unoccupied state of a channel. The UE does not perform signal transmission in the CCA section.

The operation mentioned earlier in the paragraph (1) has a merit capable of not using a reservation signal or reducing the use of the reservation signal by separately configuring a CCA section for an SRS and transmitting the SRS only. Yet, since the operation is not matched with one of the FBE scheme and the LBE scheme, the operation may have a regulation violation. Hence, as an additional method, the present invention proposes a method of sharing a CCA section for an SRS and a CCA section for a PUSCH by making a position at which the SRS is transmitted precede a position at which the PUSCH is transmitted. In this case, a UE transmitting PUSCH only can transmit a reservation signal in a time period between a CCA and PUSCH transmission. It is preferable to design the reservation signal and the SRS to be multiplexed. The multiplexing of the reservation signal and the SRS is explained in detail in the paragraph (2.1).

In the following, an example of configuring a subframe consisting of 14 SC-FDMA symbols in total is explained in detail. A PUSCH CCA and an SRS CCA correspond to a CCA section for transmitting PUSCH and a CCA section for transmitting an SRS, respectively.

Embodiment 2-1

Figure 11:
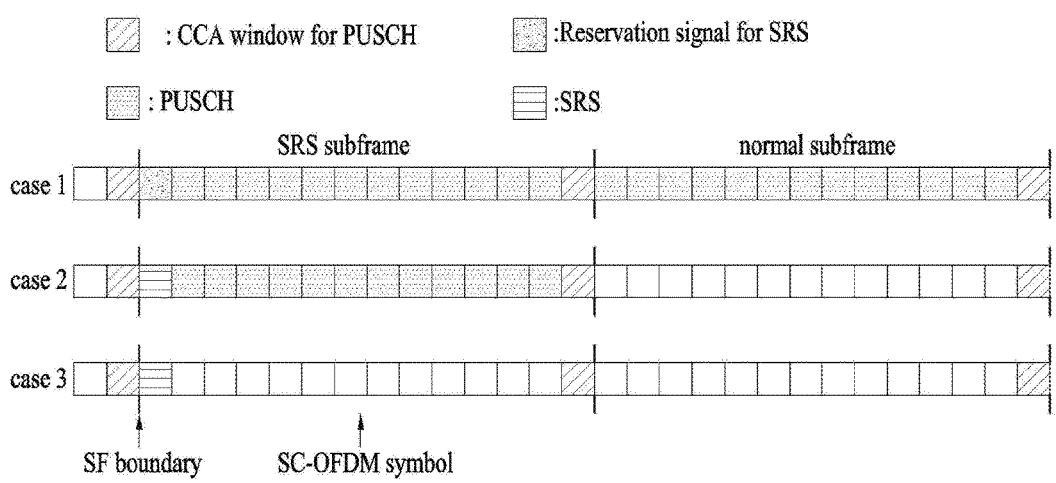
FIG. 11 is a diagram for a usage per symbol in an SRS subframe and a normal subframe according to one embodiment of the present invention.

PUSCH CCA/SRS CCA
14$^{th}$ symbol (last symbol) of normal/SRS subframe
Reservation Signal for PUSCH
1$^{st}$ symbol of SRS subframe
SRS
1$^{st}$ symbol of SRS subframe
FIG. 11 shows a usage of each symbol in the cases 1 to 3 in case of following the embodiment 2-1.

Embodiment 2-2

Figure 12:
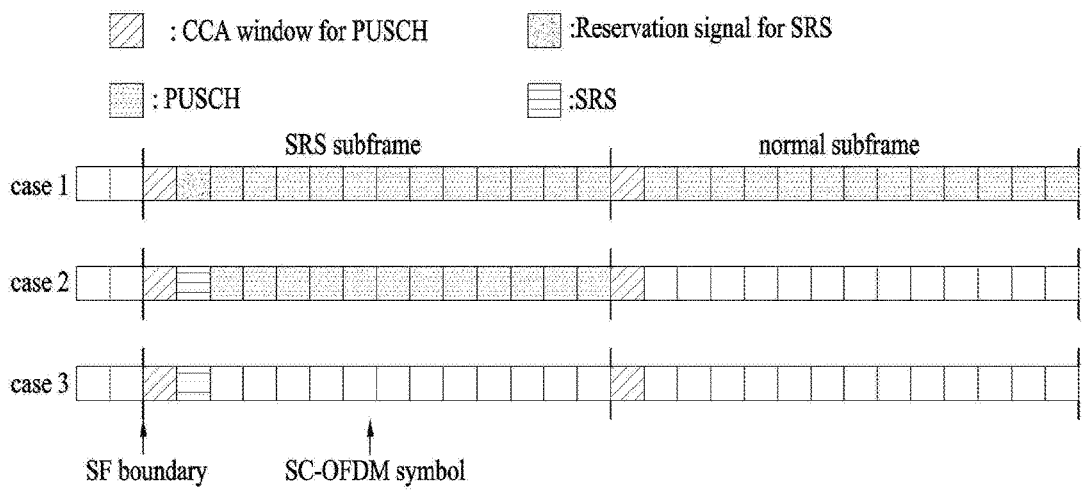
FIG. 12 is a diagram for a usage per symbol in an SRS subframe and a normal subframe according to one embodiment of the present invention.

PUSCH CCA/SRS CCA
1$^{st}$ symbol of normal/SRS subframe
Reservation Signal for PUSCH
2$^{nd}$ symbol of SRS subframe
SRS
2$^{nd}$ symbol of SRS subframe
FIG. 12 shows a usage of each symbol in the cases 1 to 3 in case of following the embodiment 2-2.

Embodiment 2-3

Figure 13:
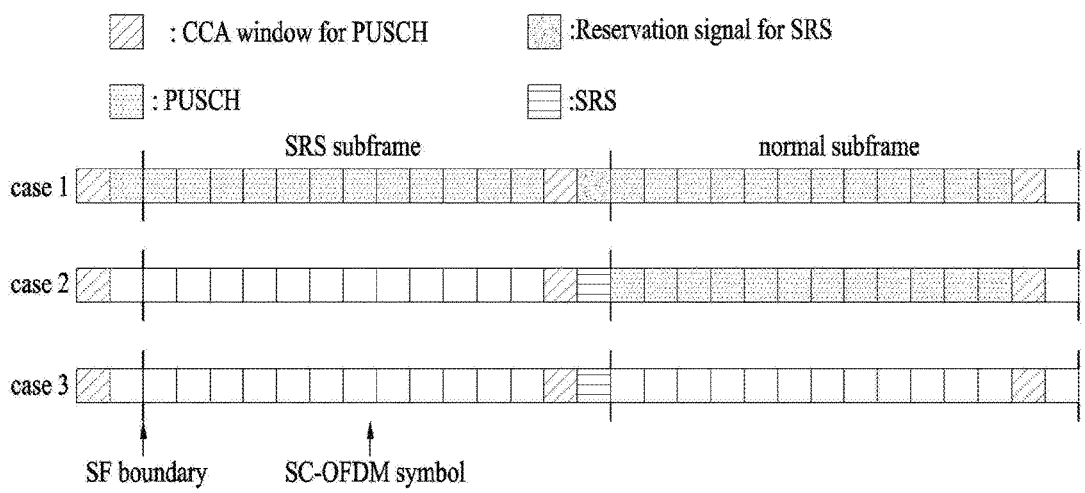
FIG. 13 is a diagram for a usage per symbol in an SRS subframe and a normal subframe according to one embodiment of the present invention.

PUSCH CCA/SRS CCA
13$^{th}$ symbol (symbol appearing prior to the last symbol as many as 1 symbol) of normal/SRS subframe
Reservation Signal for PUSCH
14$^{th}$ symbol (last symbol) of SRS subframe
SRS
14$^{th}$ symbol (last symbol) of SRS subframe
FIG. 13 shows a usage of each symbol in the cases 1 to 3 in case of following the embodiment 2-3.

Embodiment 2-4

Figure 14:
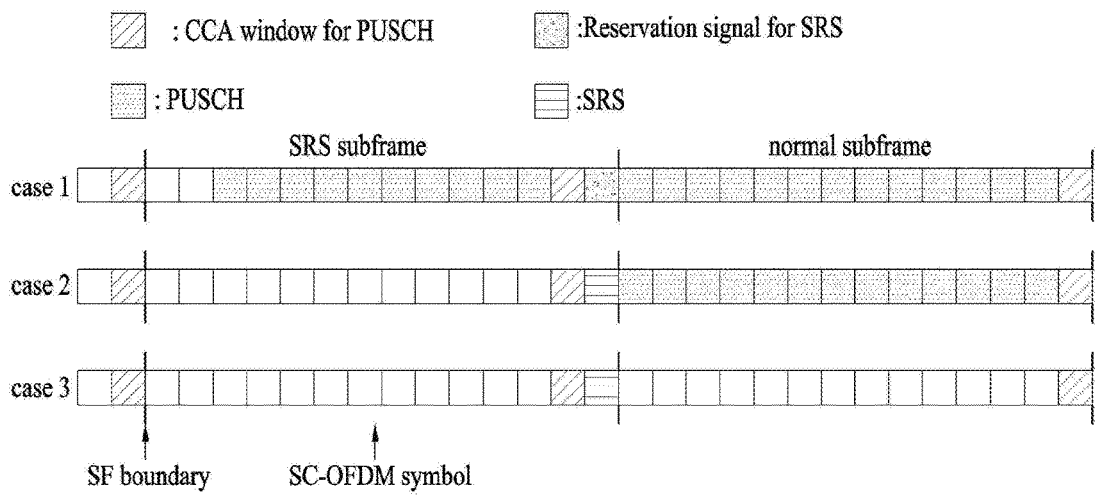
FIG. 14 is a diagram for a usage per symbol in an SRS subframe and a normal subframe according to one embodiment of the present invention.

PUSCH CCA/SRS CCA
Normal/SRS subframe: 14$^{th}$ symbol (last symbol)
SRS subframe: 13$^{th}$ symbol (symbol appearing prior to the last symbol as many as 1 symbol) of normal/SRS subframe
Reservation Signal for PUSCH
14$^{th}$ symbol (last symbol) of SRS subframe
SRS
14$^{th}$ symbol (last symbol) of SRS subframe
FIG. 14 shows a usage of each symbol in the cases 1 to 3 in case of following the embodiment 2-4.

The embodiment 2-1, the embodiment 2-2, the embodiment 2-3, and the embodiment 2-4 have characteristics described in the following.

(i) PUSCH CCA and SRS CCA are set to the same symbol.

(ii) If SRS transmission exists,
SRS is transmitted during 1 SC-FDMA symbol after CCA in SRS subframe.

(iii) If SRS transmission does not exist and PUCCH is transmitted only,
a reservation signal is transmitted during 1 SC-FDMA symbol after CCA in SRS subframe and then PUSCH is transmitted.

In this case, a transmission length of PUSCH is subframe-specifically determined. A transmission length of PUSCH in a normal subframe is different from a transmission length of PUSCH in an SRS subframe (i.e., the transmission length of PUSCH in the SRS subframe is shorter than the transmission length of PUSCH in the normal subframe). The structure for transmitting an SRS and PUSCH proposed by the [embodiment 2-1], the [embodiment 2-2], and the [embodiment 2-3] can support the UL transmission operation of the Mux 1 and the Mux 2 shown in the [Reference 2].

In addition, the [embodiment 2-4] has a characteristic described in the following.

(i) A position of a CCA section in a normal subframe and a position of a CCA section in an SRS subframe are differently configured.

In particular, the [embodiment 2-4] has a characteristic that PUSCH CCA or SRS CCA is subframe-specifically configured. As mentioned earlier in the [embodiment 2-4], since it is not necessary to configure a CCA section in the normal subframe in consideration of SRS transmission, it may be efficient to configure a CCA near a subframe boundary. On the contrary, it is preferable to pull a CCA as much as 1 SC-FDMA symbol in an SRS subframe in consideration of SRS transmission.

(2.1) Multiplexing Between SRS and Reservation Signal

When a UE performs signal transmission based on an LBT operation according to specific embodiment of the present invention and performs the operation of the paragraph (2) at the time of transmitting an SRS, the present invention proposes a method of multiplexing a reservation signal of the paragraph (2) with an SRS using one of schemes described in the following or a combination thereof.

(a) FDM (frequency division multiplexing) between reservation signal and SRS

An eNB configures a frequency resource (e.g., RB) in which a reservation signal is transmitted and a frequency resource (e.g., RB) in which an SRS is transmitted via higher layer signal (e.g., RRC).

When an SRS is divided into two regions (i.e., a set of odd-numbered subcarriers and a set of even-numbered subcarriers) using IFDMA scheme, one resource region is allocated for SRS transmission and another resource region is allocated for reservation signal.

(b) CDM (code division multiplexing) between reservation signal and SRS

A specific SRS bandwidth configured by an eNB, frequency offset, and an SRS resource corresponding to CS (cyclic shift) are utilized as a reservation signal.

In the (a) described based on the FDM scheme, the reservation signal may correspond to a known sequence promised between the UE and the eNB in advance or a data transmitted to a PUSCH resource.

In the following, an example of performing FDM on a reservation signal and an SRS in an SC-FDMA symbol in which the SRS is transmitted is explained.

Figure 15:
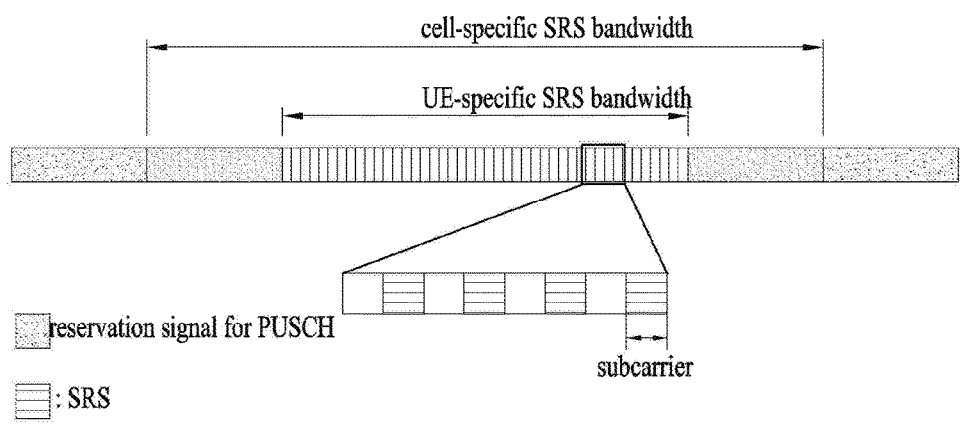
FIG. 15 is a diagram for explaining multiplexing between an SRS and a reservation signal according to one embodiment of the present invention.

According to the embodiment of the present invention, as shown in FIG. 15, assume that an SRS is transmitted as much as a UE-specific SRS bandwidth within a cell-specifically configured cell specific SRS bandwidth with a prescribed frequency offset in LTE system. In this case, an eNB can configure a UE performing PUSCH transmission only to transmit a reservation signal for a PUSCH resource at an outside area of the cell specific SRS bandwidth. Similarly, a specific RB (resource block) is configured as a region in which a reservation signal is transmitted and the eNB can configure the UE performing PUSCH transmission only not to transmit an SRS in the specific RB.

As mentioned earlier in the operation of the present invention, when FDM is performed on an SRS and a reservation signal, the reservation signal may correspond to PUSCH (data) to be transmitted by the UE.

For example, in LTE system according to the embodiment of the present invention, if a type 0 SRS is transmitted in an SRS subframe and a UE transmits PUSCH only in the subframe, the UE can transmit PUSCH (data) at the outside of a cell specific SRS bandwidth of an SC-FDMA symbol in which an SRS is transmitted. In this case, the UE can transmit a part of the PUSCH in the symbol in which the SRS is transmitted to use the symbol as a reservation signal for transmitting the PUSCH.

Yet, in Rel-12 LTE system or LTE system of a previous release, since an SRS subframe in which a type 1 SRS is transmitted is configured not to transmit PUSCH in the SC-FDMA symbol in which the SRS is transmitted, it is unable to support the aforementioned operation that transmits the PUSCH (data) using the reservation signal. The reason why the PUSCH transmission is restricted is, since whether to transmit an SRS is indicated not only by DCI (e.g., DCI format 1A) but also by DCI for indicating a UL grant in a subframe in which the type 1 SRS is transmitted, although the UE performs PUSCH transmission by detecting the DCI for indicating the UL grant, unable to guarantee whether or not an SRS is triggered. In this case, if PUSCH transmission is permitted in a symbol in which the type 1 SRS is transmitted according to a determination of a UE despite of the ambiguity, since both PUSCH and an SRS can be transmitted at the same time depending on whether or not DCI is detected, PARR (peak to average power ratio) of the UE can be rapidly increased.

Meanwhile a recent LTE system considers a UE capable of simultaneously transmitting PUCCH and PUSCH and UE capability is gradually enhancing. Hence, if simultaneous transmission of PUCCH and PUSCH is additionally configured or the UE reports that the UE is able to transmit an SRS and PUSCH at the same time using capability of the UE, the present invention proposes a method for configuring a reservation signal to be transmitted at an outside area of a cell-specific SRS bandwidth in a subframe in which the type 1 SRS is transmitted.

Figure 16:
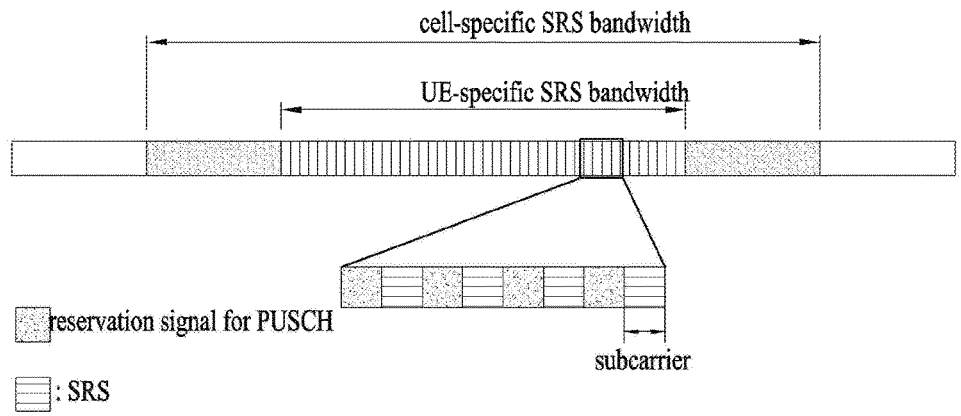
FIG. 16 is a diagram for explaining multiplexing between an SRS and a reservation signal according to one embodiment of the present invention.

As a different example of performing FDM on a reservation signal and an SRS resource, as shown in FIG. 16, it may consider a method of configuring a resource region for a reservation signal among two comb-type resource regions which are divided according to IFDMA structure of an SRS.

(3) Configurable SRS Transmission without LBT

According to the embodiment of the present invention, when a UE performs signal transmission based on an LBT operation, an eNB informs the UE of whether or not the UE is able to perform SRS transmission without LBT operation via higher layer signalling. The UE can perform the following according to the indication of the eNB.

(a) If the UE is configured to perform the SRS transmission without LBT operation,
the UE performs SRS transmission without a separate CCA.

(b) If the UE is configured not to perform the SRS transmission without LBT operation,
the UE performs SRS transmission according to the operations mentioned earlier in the paragraph (1) or (2).

LBT-related regulation is defined according to a country or a region and can be configured by different contents. For example, according to the regulation of EU (European Union), a signal equal to or less than 2.5 ms can be transmitted without a separate CCA. Hence, as shown in FIGS. 17 and 18, it may be able to support an SRS transmission structure (e.g., the last part of PUSCH transmission or the last symbol of a subframe) of a legacy LTE system without a separate reservation signal.

Figure 17:
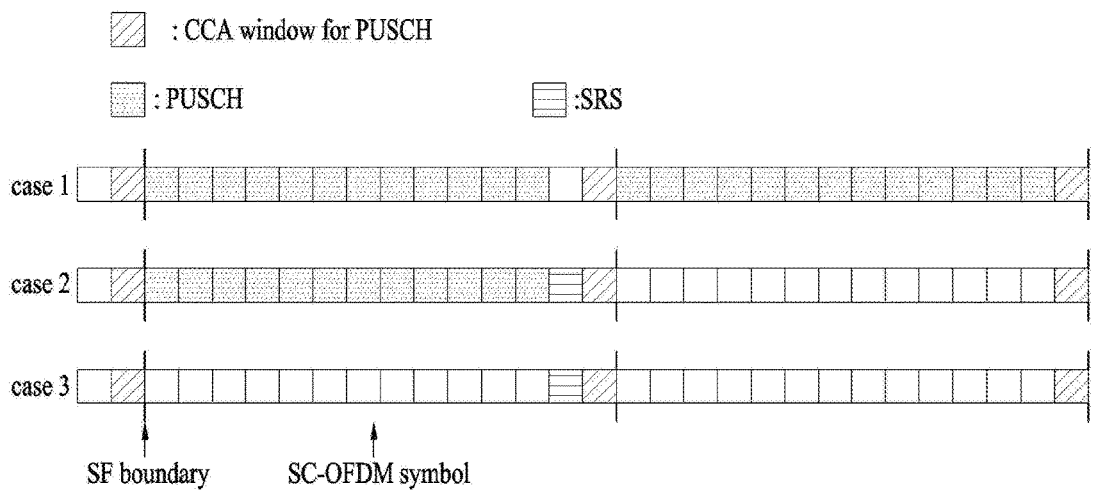
FIG. 17 is a diagram for a usage per symbol in an SRS subframe and a normal subframe according to one embodiment of the present invention.
Figures 18, 19:
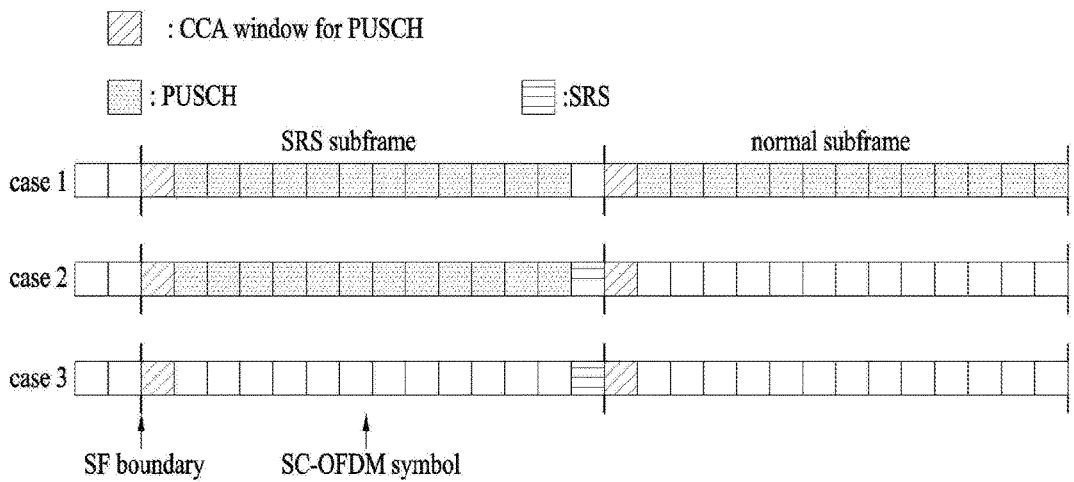
FIG. 18 is a diagram for a usage per symbol in an SRS subframe and a normal subframe according to one embodiment of the present invention.
FIG. 19 is a diagram for an example of mapping a resource of UCI.

The operations according to FIG. 17 and FIG. 18 are referred to as an embodiment 3-1 and an embodiment 3-2, respectively.

In this case, the structure shown in FIG. 17 or FIG. 18 can further utilize a PUSCH transmission resource as much as 1 SC-FDMA symbol compared to the embodiments mentioned earlier in the paragraph (1) or (2). Hence, it may be preferable for an eNB to permit SRS transmission without LBT to a UE according to a region in the aspect of resource utilization efficiency.

(4) Additional Issue when a New SRS Transmission Structure is Introduced

In the following, associated issues additionally occurred when an SRS transmission structure mentioned earlier in the paragraphs (1), (2), or (3) is introduced according to the operation proposed by the present invention and a solution are explained.

(4.1) Subframe Specific UCI Piggyback Rule

According to the specific embodiment of the present invention, when a UE performs signal transmission based on an LBT operation and a new SRS structure mentioned earlier in the paragraphs (1), (2), or (3) is introduced, the present invention proposes following operations as operations performed by the UE in case that the UE transmits UCI to a PUSCH resource (or data transmission channel) and a time period (symbol) to which a coded symbol for the UCI is allocated, a time period (symbol) in which an SRS is transmitted, and a time period (symbol) configured by a CCA section are overlapped. The symbol in parenthesis corresponds to a unit on a time axis constructing a radio resource. For example, the symbol may correspond to an SC-FDMA symbol.

(a) When symbol to which UCI is mapped is overlapped with SRS transmission symbol,
transmit UCI without transmitting SRS
transmit SRS and map coded symbol of UCI to RE for the remaining region only except the overlapped symbol transmit SRS and perform puncturing on coded symbols of UCI allocated to the overlapped symbol (b) When symbol to which UCI is mapped is overlapped with symbol to which CCA is set, map coded symbol of UCI to RE for the remaining region only except the overlapped symbol perform puncturing on coded symbols of UCI allocated to the overlapped symbol According to the specific embodiment of the present invention, LTE system divides characteristic of information into UCI and data in UL and designs PUCCH on which UCI is transmitted and PUSCH on which data is transmitted. Yet, when a UE is not configured to transmit PUCCH and PUSCH at the same time, if PUSCH is transmitted at the time of transmitting UCI, the UE transmits the UCI in a manner of performing piggyback on the UCI using PUSCH. FIG. 19 shows a scheme of mapping HARQ-ACK (e.g., A/N), an RI (rank indicator), a CQI (channel quality indicator)/PMI (precoding matrix indicator) in a resource region when a normal CP (cyclic prefix) is set and the UCI is transmitted on PUSCH.

FIG. 19 shows an example for a case that a PUSCH resource is allocated using 1 RB in LTE system according to the embodiment of the present invention. In FIG. 19, a horizontal axis corresponds to SC-FDMA symbols and a vertical axis corresponds to subcarriers. In this case, a time index of the SC-FDMA symbols increases as the time index is moved to the right from the left. A frequency index of the subcarriers increases as the frequency index is moved to the bottom from the top. A region is represented by a different hatching according to a type of UCI and a number in the same region corresponds to a mapping order of a coded symbol. In this case, mapping is performed on CQI/PMI without considering a resource position of HARQ-ACK (e.g., A/N). Hence, if the HARQ-ACK occupies the entire SC-FDMA symbols, as shown in FIG. 19, CQI/PMI of a corresponding position is punctured.

As shown in FIG. 19, when UCI is piggybacked, at least one SC-FDMA symbol for RI mapping is overlapped with SC-FDMA symbol for an SRS or a CCA in case of the embodiment 1-1, the embodiment 1-2, the embodiment 2-2, the embodiment 2-3, the embodiment 2-4, and the embodiment 3-1. In particular, in case of the embodiment 1-1, an SC-FDMA symbol for transmitting HARQ-ACK is overlapped with CCA. In this case, it is necessary to define a UE operation. Hence, if an SRS or a CCA section exists in a symbol to which UCI is allocated, the present invention considers methods that the SRS is not transmitted or a position of the symbol to which the UCI is allocated is restricted to protect the UCI.

For example, FIG. 20 shows a method of excluding an SC-FDMA symbol from a coded symbol mapping target of UCI when the SC-FDMA symbol to which the UCI is mapped is overlapped with an SRS or a CCA, when PUSCH is configured by 1 RB. In this case, the last 2 SC-FDMA symbols correspond to an SRS or a CCA section.

(4.2) Method of Controlling Position of Subframe Specific DM-RS (Demodulation Reference Signal) Transmission Symbol According to the specific embodiment of the present invention, when a UE performs signal transmission based on an LBT operation and a new SRS structure mentioned earlier in the paragraphs (1), (2), or (3) is introduced, the present invention proposes a method of configuring a time period (or symbol) in which DM-RS is transmitted in an SRS subframe in a manner of being different from a time period (or symbol) in which DM-RS is transmitted in a normal subframe. In addition, it may be able to change a mapping rule for a coded symbol of UCI for the SRS subframe in accordance with the changed position at which DM-RS is transmitted. In particular, it may be able to subframe-specifically determine a DM-RS transmission position and an RE mapping rule for a coded symbol of UCI.

For example, assume that an SRS is transmitted like the embodiment 2-4 and, as shown in FIG. 20, a DM-RS is transmitted in a $4^{th}$ SC-FDMA symbol and an $11^{th}$ SC-FDMA symbol. And, assume that $1^{st}$ to $7^{th}$ SC-FDMA symbols correspond to a first slot and $8^{th}$ to $14^{th}$ SC-FDMA symbols correspond to a second slot. In this case, PUSCH transmitted in the second slot of the SRS subframe has an asymmetrical shape leaning to the front side on the basis of a DM-RS. More preferably, if a position of a DM-RS divides a PUSCH resource in a symmetrical shape, it may have good channel estimation performance. For example, as shown in FIG. 21, it may be able to change a position at which a DM-RS is transmitted.

In this case, the last 2 SC-FDMA symbols correspond to an SRS or a CCA section.

(4.3) Method of Applying Half Symbol SRS

According to the specific embodiment of the present invention, when a UE performs signal transmission based on an LBT operation and a new SRS structure mentioned earlier in the paragraphs (1), (2), or (3) is introduced, the present invention proposes a method of configuring an SRS consisting of half symbols and a CCA section within a half symbol to be positioned at a single symbol in a manner of being adjacent to each other. Or, the present invention proposes a method of configuring a length of a CCA section in a specific subframe (or SRS subframe) to be different from a length of a CCA section in a normal subframe.

According to the specific embodiment of the present invention, an SRS structure may have a comb shape in a frequency axis according to IFDMA and the structure can be represented by a shape of repeating two times in a time axis. Hence, a UE can implement a half symbol SRS by transmitting a legacy SRS during the half of SC-FDMA time only.

Figure 22:
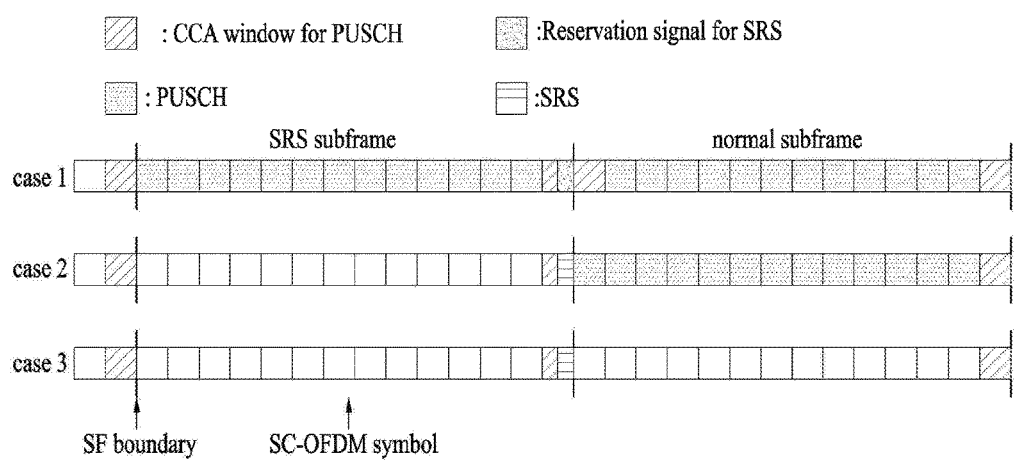
FIG. 22 is a diagram for a usage per symbol in an SRS subframe and a normal subframe according to one embodiment of the present invention.

For example, when the half symbol SRS is utilized, if the SRS consisting of half symbols and the CCA section within a half symbol mentioned earlier in the embodiment 2-4 are applied, the half symbol SRS can be represented as FIG. 22.

In this case, it may be able to further utilize a PUSCH resource as much as 1 SC-FDMA symbol and naturally solve the UCI piggyback issue mentioned earlier in the paragraph (4.1). The operation of the present invention has a characteristic that a length of a CCA section is subframe-specifically changed. In other word, a relatively short CCA section is applied in an SRS subframe and a relatively long CCA section can be applied in a normal subframe.

Figure 23:
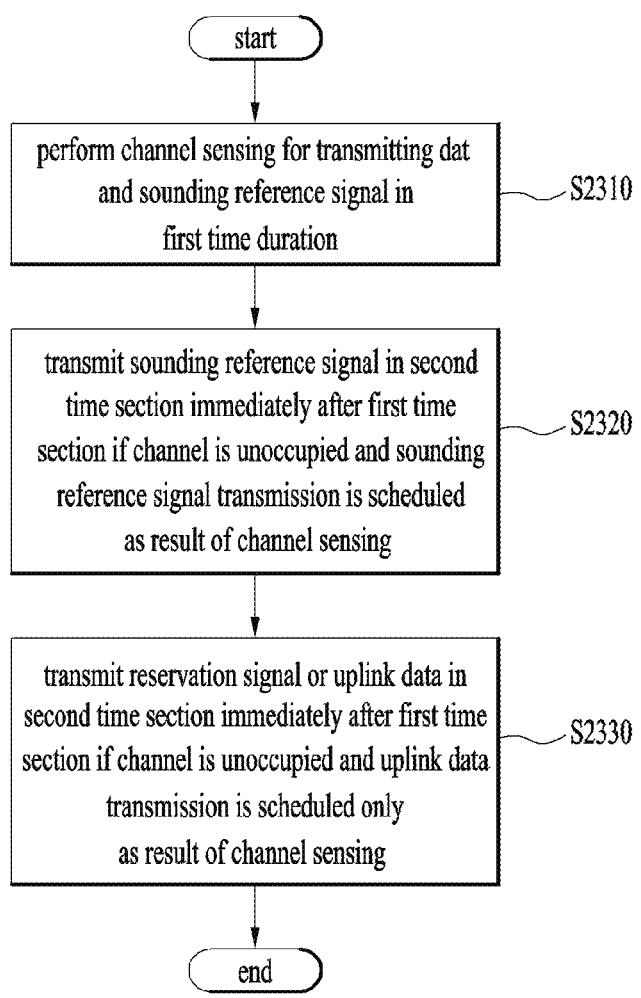
FIG. 23 is a flowchart for an operation according to embodiment of the present invention.

FIG. 23 is a flowchart for an operation according to embodiment of the present invention. FIG. 23 relates to a method of transmitting an uplink signal on an unlicensed band in a wireless communication system. A terminal may perform channel sensing for transmitting data and a sounding reference signal in a first time duration [S2310]. As a result of the channel sensing, if a channel is unoccupied and sounding reference signal transmission is scheduled, the terminal may transmit the sounding reference signal in a second time duration immediately after the first time duration [S2320]. As a result of the channel sensing, if a channel is unoccupied and uplink data transmission is scheduled only, the terminal may transmit a reservation signal or the uplink data in the second time duration immediately after the first time duration [S2330]. The time duration may include one uplink symbol or the half of an uplink symbol.

In this case, a position of the first time duration may vary depending on whether or not a subframe is configured to transmit a sounding reference signal. And, a transmission length of the uplink data may be subframe-specifically determined.

After the reservation signal is transmitted in the second time duration, the terminal may transmit the uplink data in at least one symbol appearing after the second time duration.

The reservation signal may include a sequence promised in advance between the terminal and the base station or data transmitted on PUSCH.

The reservation signal may be multiplexed with the sounding reference signal. And, the reservation signal may be allocated to a resource corresponding to the outside of a cell-specific sounding reference signal bandwidth. Moreover, the reservation signal may be allocated to a resource corresponding to the inside of a terminal-specific sounding reference signal bandwidth.

If the first time duration is overlapped with a time duration in which uplink control information is to be transmitted, the terminal may map uplink control information to the remaining time duration except the overlapped time duration or may perform puncturing on uplink control information allocated to the overlapped time duration.

If the second time duration is overlapped with a time duration in which uplink control information is to be transmitted, the terminal mat transmis the uplink control information without transmitting the sounding reference signal. Or, the UE maps uplink control information to the remaining time duration except the overlapped time duration while transmitting the sounding reference signal or may perform puncturing on uplink control information allocated to the overlapped time duration.

The terminal may allocate an uplink modulation reference signal in a time duration of a subframe in which the sounding reference signal is transmitted, the time duration being different from a time duration in which an uplink modulation reference signal is allocated in a normal subframe.

Figure 24:
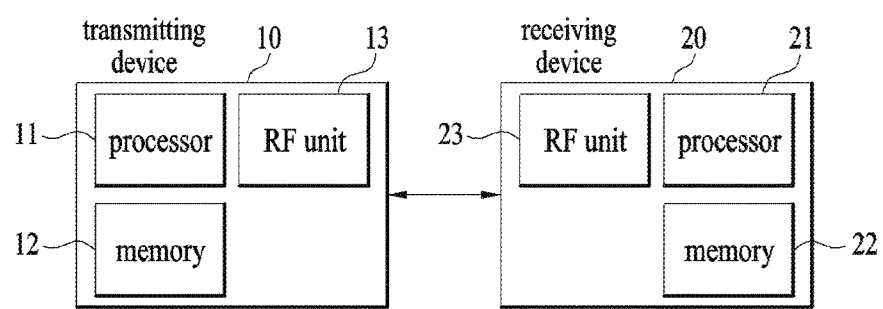
FIG. 24 is a block diagram for a device for implementing embodiment(s) of the present invention.

FIG. 24 is a block diagram of a transmitting device 10 and a receiving device 20 configured to implement exemplary embodiments of the present invention. Referring to FIG. 24, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency downconverts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a relay and a base station (BS).

What is claimed is:

1. A method for a terminal transmitting an uplink signal, which is transmitted in a sounding reference signal (SRS) subframe on an unlicensed band in a wireless communication system, the method comprising:
    performing channel sensing for transmitting both uplink data and a SRS in a first time duration;
    transmitting the SRS in a second time duration immediately after the first time duration in response to a channel being unoccupied as a result of the channel sensing and a transmission of the SRS being scheduled in the SRS subframe;
    transmitting a reservation signal in the second time duration immediately after the first time duration in response to the channel being unoccupied as a result of the channel sensing and the transmission of the SRS not being scheduled in the SRS subframe; and
    transmitting the uplink data in a third time duration immediately after the second time duration in response to the channel being unoccupied as a result of the channel sensing and transmission of the uplink data being scheduled in the SRS subframe.

2. The method of claim 1, wherein a position of the first time duration for the SRS subframe is one symbol earlier than a position of the first time duration for a normal subframe.

3. The method of claim 1, wherein a transmission length of the uplink data in the SRS subframe is shorter than a transmission length of uplink data in a normal subframe.

4. The method of claim 1, wherein the reservation signal comprises a sequence promised with a base station in advance or data transmitted via a PUSCH resource.

5. The method of claim 1, wherein the reservation signal is multiplexed with the SRS.

6. The method of claim 1, wherein the reservation signal is allocated to a resource corresponding to outside of a cell-specific SRS bandwidth.

7. The method of claim 1, wherein the reservation signal is allocated to a resource corresponding to inside of a terminal-specific SRS bandwidth.

8. The method of claim 1, in response to the first time duration being overlapped with a time duration in which uplink control information is to be transmitted, the method further comprises mapping the uplink control information to a remaining time duration except the overlapped time duration or performing puncturing on the uplink control information allocated to the overlapped time duration.

9. The method of claim 1, in response to the second time duration being overlapped with a time duration in which uplink control information is to be transmitted, the method further comprises transmitting the uplink control information without transmitting the SRS, or mapping the uplink control information to a remaining time duration except the overlapped time duration while transmitting the SRS, or performing puncturing on the uplink control information allocated to the overlapped time duration.

10. The method of claim 1, further comprising allocating an uplink modulation reference signal in a time duration of a subframe in which the SRS is transmitted, the time duration being different from a time duration in which an uplink modulation reference signal is allocated in a normal subframe.

11. The method of claim 1, wherein the first time duration comprises one uplink symbol or half of an uplink symbol.

12. A terminal transmitting an uplink signal, which is transmitted in a sounding reference signal (SRS) subframe on an unlicensed band in a wireless communication system, the terminal comprising:
    an RF (radio frequency) unit; and
    a processor configured to:
    control the RF unit,
    perform channel sensing for transmitting uplink data and a SRS in a first time duration,
    transmit the SRS in a second time duration immediately after the first time duration in response to a channel being unoccupied as a result of the channel sensing and a transmission of the SRS being scheduled in the SRS subframe,
    transmit a reservation signal in the second time duration immediately after the first time duration in response to the channel being unoccupied as a result of the channel sensing and the transmission of the SRS not being scheduled in the SRS subframe, and
    transmit the uplink data in a third time duration immediately after the second time duration in response to the channel being unoccupied as a result of the channel sensing and a transmission of the uplink data being scheduled in the SRS subframe.

* * * * *